United States Patent [19]

Boyce

[11] Patent Number: 4,476,892
[45] Date of Patent: Oct. 16, 1984

[54] DUAL PURPOSE REFRIGERANT CONNECTOR

[76] Inventor: Harold L. Boyce, 1411 N. Yale, Tulsa, Okla. 74115

[21] Appl. No.: 533,525

[22] Filed: Sep. 19, 1983

[51] Int. Cl.³ ............................................. F25B 45/00
[52] U.S. Cl. .................................. 137/322; 137/614.02; 137/614.05; 62/292; 251/149.4; 251/149.6; 251/149.8; 251/348
[58] Field of Search ................... 137/322, 231, 614.02, 137/614.04, 614.05; 62/292, 299; 251/149.1, 149.4, 149.8, 149.6, 348

[56] References Cited

U.S. PATENT DOCUMENTS

| | | | |
|---|---|---|---|
| 2,397,265 | 3/1946 | Jacobsson | 137/614.04 |
| 2,735,696 | 2/1956 | Omon et al. | 137/614.05 |
| 3,500,859 | 3/1970 | Pearson | 137/614.05 |
| 3,807,687 | 4/1974 | Thompson | 251/149.4 |
| 4,069,686 | 1/1978 | Hoelman | 137/322 |
| 4,327,770 | 5/1982 | Brown et al. | 137/614.05 |
| 4,332,273 | 6/1982 | Boyce | 137/322 |

Primary Examiner—George L. Walton
Attorney, Agent, or Firm—Head, Johnson & Stevenson

[57] ABSTRACT

A connector used in resupplying refrigerant is adaptable to provide a leakproof connection with either a Schroeder-type valve or a standard or service-type valve fitting.

1 Claim, 4 Drawing Figures

DUAL PURPOSE REFRIGERANT CONNECTOR

BACKGROUND OF THE INVENTION

1. Field of the Invention

The present invention relates to refrigeration systems and in particular a dual purpose, valve which is adapted to open a Schroeder-type core valve and a standard or service valve fitting with minimal loss of refrigerant.

2. Description of the Prior Art

This invention is an improvement over U.S. Pat. No. 4,332,273 dated June 1, 1982, and the prior art cited therein.

Due to the concern for the pollution of the atmosphere caused by vapor refrigerants, such as, Freon, various types of connectors have been designed to prevent the escape of vapor from a refrigerant system which is being resupplied or repressured from a pressurized refrigerant source. The refrigerant systems are usually provided with either a Schroeder-type valve, which is well known in the prior art and/or a standard or service valve fitting. Prior to the above-referenced patent, as the connector is tightened on one or the other of the valves, refrigerant from the pressurized source would leak either as a liquid from the high pressure side of the refrigerant system or vapor from the low pressure side, before a seal is formed by the connector. Occassionally when this occurs liquid refrigerant being released into the atmosphere from a high pressure causes moisture to freeze on the connector, nut and threads making its difficult to complete the connection and/or remove same. As a result, pressurized refrigerant sprays into the atmosphere and many times, on the hands of the operator, which can cause severe burn. If the nut freezes and cannot be turned the refrigerant from the whole system may be lost.

A standard or service type valve is usually permanently a part of the refrigerant system. The valve includes a standard threaded connector for coupling with a pressure supply of refrigerant. To repressure the system, a valve associated with the refrigerant is opened, thence the service valve is opened to provide communication with the system.

SUMMARY OF THE INVENTION

The present invention provides a connector which prevents the escape of fluids from either a Schroeder-type core valve or a standard or service type valve and which further provides a safe connection which eliminates the possibility of escape of high pressure refrigerant fluid and its contacting human flesh and further prevents the possibility of the connector freezing in an open position, which would otherwise allow the escape of high pressure fluid from the system.

The invention provides a coupling body having a first bore connected to a pressurized refrigerant supply fluid and a second bore connectable to the servicing valve (Schroeder or standard type). A first piston-like member has a rod which extends into the second bore. The first piston normally closes the communicative opening between the first and second bores by a spring thereagainst. A Schroeder-type valve stem when connected to the second bore will move the rod and first piston, opening communication between the first and second bores. A second piston operates in the second bores. A second piston operates in the second bore. A ring is attached to the first piston rod adjacent the second piston. Movement of the second piston abuts the ring which will move the first piston rod to the open position. This movement occurs during attachment of the threaded connector of a service type valve.

BRIEF DESCRIPTION THE DRAWINGS

FIG. 4 is a sectional view taken along the line 4—4 of FIG. 3.

DETAILED DESCRIPTION OF THE DRAWINGS

Before explaining the present invention in detail, it is to be understood that the invention is not limited in its application to the details of construction and arrangement of parts illustrated in the accompanying drawings, since the invention is capable of other embodiments and of being practiced or carried out in a variety of ways. Also, it is to be understood that the phraseology or terminology employed herein is the purpose of description and not of limitation.

Figure 1:
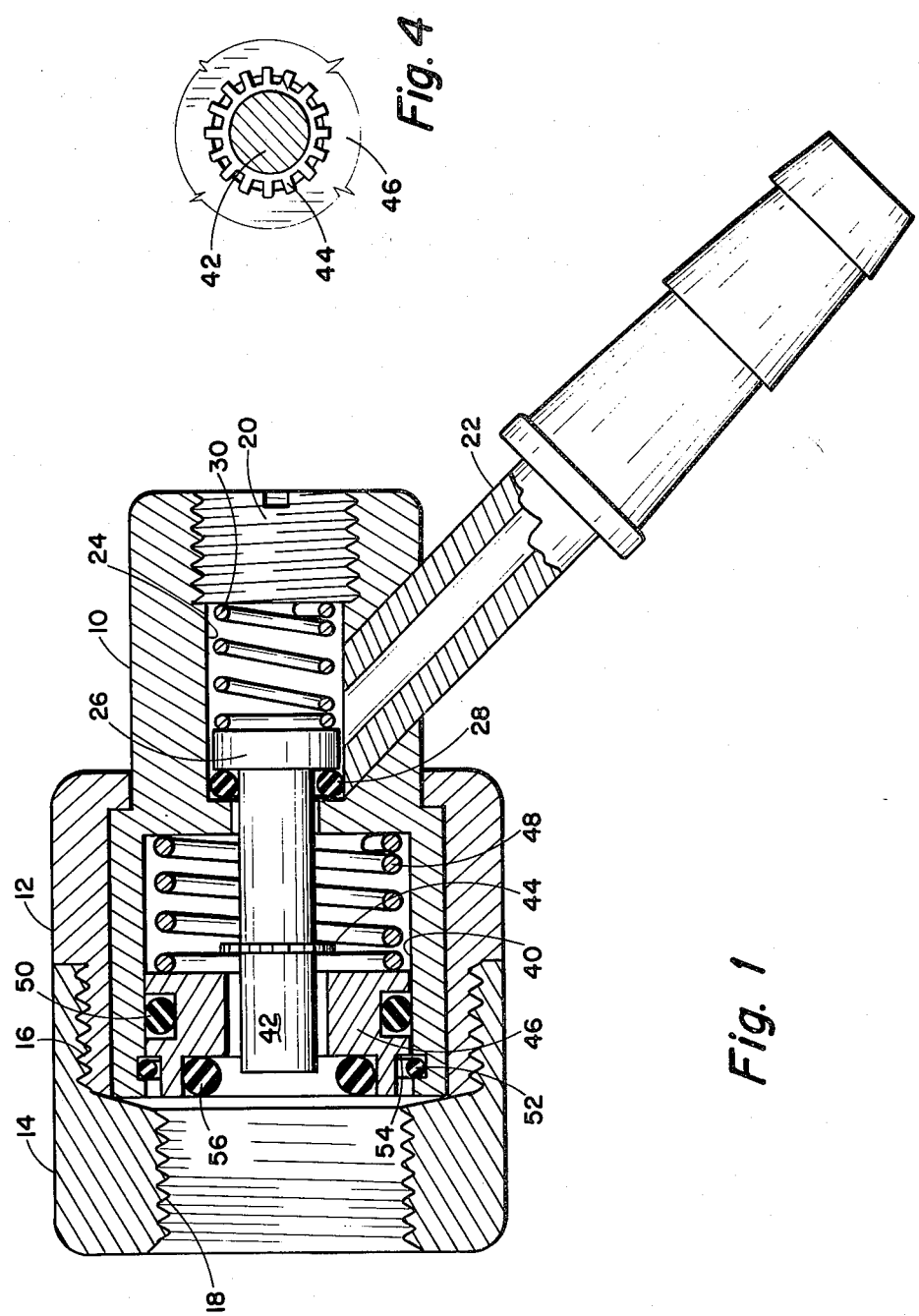
FIG. 1 is a partial sectional view of the valve of this invention.

Referring now to FIG. 1, the valve of this invention is described having a body formed of inner housing 10 and outer housings 12 and 14 connected together by threads 16. Threads 18 are adapted to receive a Schroeder-type or standard or service-type refrigerant valve. A threaded plug 20 at the end of housing 10 permits the assembly and disassembly and/or repair of the internal valve parts. A high pressure refrigerant conduit 22 communicates with first chamber 24 which has therein a piston 26 which seats upon O-ring 28 and is normally biased by spring 30, which causes the piston or valve 26 to seat on the O-ring 28. Coaxially therewith is a second chamber 40 which accepts rod 42 formed as apart of the piston 26. The stop ring 44 may be a wire clip, or slotted member as shown in FIG. 4, which allows refrigerant to pass therethrough. A stop ring member 44 is attached to rod 42. A piston 46 is operative to move within the enlarged bore 40, against the bias of spring 48 tending to move the piston 46 to the left as shown in FIG. 1. O-ring piston seal 50 is provided. O-ring 52 provides an additional seal for the piston surface 54, while O-ring 56 is provided at the forward end of the piston to seat with the Schroeder or standard service type valve connectors as hereafter described.

Figure 2:
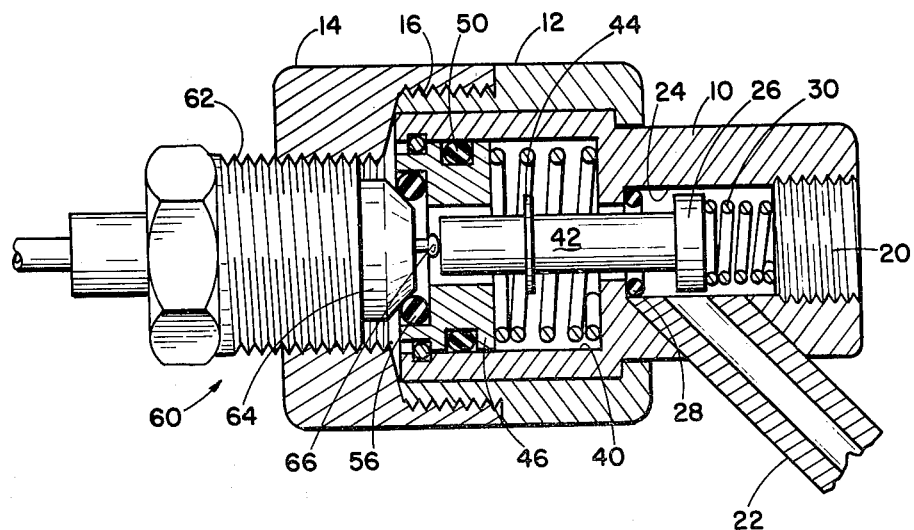
FIG. 2 is a sectional view of the valve of this invention in conduction with a Schroeder-type valve.
Figure 3:
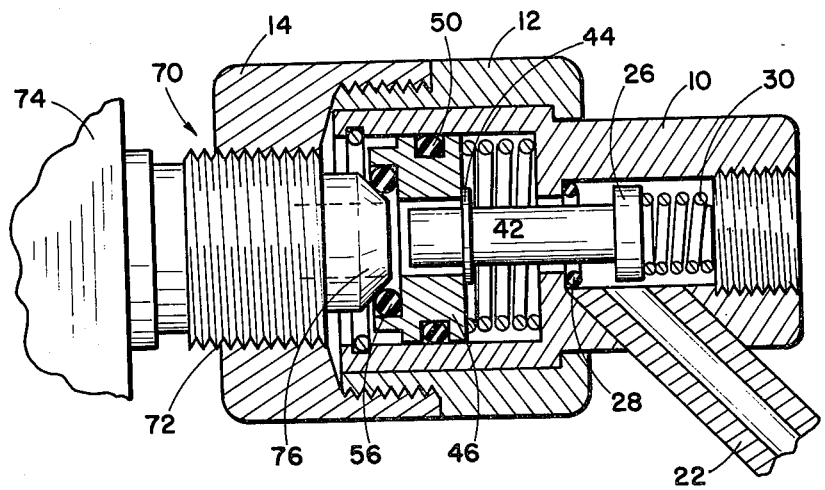
FIG. 3 is a sectional view showing a connection with a standard type or service valve.

FIGS. 2 and 3 represent the valve of this invention, used respectively with a Schroeder-type 60 and a service or standard-type valve connection 70. The Schroeder-type includes a threaded body 62 having a beveled face 64 and a plunger valve 66. The standard or service type valve 70 also includes a threaded portion 72 which connects with the valve body 74. In this embodiment the connection includes a beveled face 76 which seats against O-ring seal 56 with further threaded movement forcing piston 46 to abut stop ring 44 which moves rod 42 and piston 26 to open the passage between bores 24 and 40.

What is claimed is:

1. A coupling for safely opening a normally closed Schroeder or standard service valve which is connected to the refrigerant fluid of a compressor-type air conditioning system comprising:

a body having a coaxial first bore and, forward thereof, a second bore with an axial communication port of smaller diameter than said first and second bores therebetween, means to connect a source of high pressure refrigerant fluid to said first bore and means to connect a body of said valve with said second bore, a first piston in said first bore, said first piston having an attached rod which extends into said second bore through said port, means to seat said first piston on its rod side to a surface that surrounds said first bore to normally close said port, spring means biasing said piston to the seated position, a second piston sealed in said second bore having an opening coaxially larger than said rod to reciprocally receive at least a portion of said rod therein, means biasing said second piston towards said means to connect with said valve, means on the forward end of said second piston to seal with said body which is a part of said valve prior to said valve being opened and prior to the movement of said first piston off of said seat for admittance of said high pressure refrigerant fluid through said port by the movement of said first piston, and a stop ring attached to said rod and situated in said second bore to be engaged by said second piston upon movement of said second piston to move said first piston away from its seat.

* * * * *